United States Patent [19]

Anderson et al.

[11] Patent Number: 6,052,692

[45] Date of Patent: Apr. 18, 2000

[54] METHOD AND SYSTEM FOR MANAGING IMAGE RELATED EVENTS WITHOUT COMPROMISING IMAGE PROCESSING

[75] Inventors: Eric C. Anderson, San Jose; Patricia Scardino, Fremont, both of Calif.

[73] Assignee: FlashPoint Technology, Inc., San Jose, Calif.

[21] Appl. No.: 09/016,153

[22] Filed: Jan. 30, 1998

[51] Int. Cl.[7] .................................................. G06F 17/30

[52] U.S. Cl. ........................ 707/102; 707/103; 707/514; 707/529; 345/349

[58] Field of Search ................................. 707/102, 514, 707/529, 530, 103; 345/348, 349, 350, 431; 382/132, 282, 284; 341/65

[56] References Cited

U.S. PATENT DOCUMENTS

| | | | |
|---|---|---|---|
| 5,262,867 | 11/1993 | Kojima | 348/39 |
| 5,610,653 | 3/1997 | Abecassis | 348/170 |
| 5,706,457 | 1/1998 | Dwyer et al. | 345/349 |
| 5,761,686 | 6/1998 | Bloomberg | 707/529 |

Primary Examiner—Wayne Amsbury
Assistant Examiner—Thu-Thao Havan
Attorney, Agent, or Firm—Sawyer Law Group

[57] ABSTRACT

A system and method for managing an image related event is disclosed. In one aspect, the method and system remove an image file on a digital imaging device. The image file is capable of including incompletely processed data. A reference to the image file is stored in a database. The method and system include ensuring that removal of the image file will not affect processing of a second image file and removing the reference to the image file from the database. In another aspect, the method and system mount a volume on a digital imaging device. The volume contains an image file capable of including incompletely processed data. The method and system include detecting the insertion of the volume, mounting the volume, providing a database including a reference to the image file, and completing image processing of the image file if the image file contains incompletely processed data.

54 Claims, 11 Drawing Sheets under field 6,052,692

METHOD AND SYSTEM FOR MANAGING IMAGE RELATED EVENTS WITHOUT COMPROMISING IMAGE PROCESSING

CROSS-REFERENCE TO RELATED APPLICATIONS

The present application is related to co-pending U.S. patent application Ser. No. 08/978,794 entitled "METHOD AND SYSTEM FOR EXTENDING THE AVAILABLE IMAGE FILE FORMATS IN AN IMAGE CAPTURE DEVICE" filed on Nov. 26, 1997 and assigned to the assignee of the present invention, now pending. The present application is also related to co-pending U.S. patent application Ser. No. 08/735,286 entitled "SYSTEM AND METHOD FOR CORRELATING PROCESSING DATA AND IMAGE DATA WITHIN A DIGITAL CAMERA DEVICE" filed on Oct. 23, 1996 and assigned to the assignee of the present application, now pending.

FIELD OF THE INVENTION

The present invention relates to digital imaging devices, including digital cameras and more particularly to a method and system for managing image related events without adversely affecting processing of images.

BACKGROUND OF THE INVENTION

One feature of conventional digital cameras is their ability to manage image related events, such as storing and accessing images on removable media. For example, conventional digital cameras often include a flash disk or other removable memory. Once processing of an image is complete, the conventional digital camera stores a file including the image on the removable memory.

In order to access the removable memory, a conventional digital camera mounts a volume such as the removable memory. What is meant by a volume in the context of the present application is a storage device which the operating software of the digital camera utilizes to store images. For example, a volume can be as above-described, a removable memory or a disk. Mounting of a volume, such as a removable memory or a disk, allows the operating software of the conventional digital camera to know that the removable memory exists and to provide access to the removable memory. Once the removable memory is mounted, the digital camera can store images to the removable memory. Unmounting of the volume allows the operating software of the conventional digital camera to know that the removable memory does not exists and to preclude access to the removable memory.

Although conventional digital cameras can store images on a removable memory, the removable memory is accessed after processing of an image is complete. Consequently, the storage device is not mounted or unmounted during processing without affecting image storage. If a user ejects a storage device during processing of an image, the image will not be stored.

In addition, a user may wish to delete an image shortly after the image has been captured. In a conventional camera, however, images are inaccessible until after image processing is completed. Thus, a user is also prevented from aborting processing of an image that is no longer desired.

Accordingly, what is needed is a system and method for managing image related events such as the mounting of a volume, the unmounting of a volume, or the deletion of an image when the image may be undergoing processing. The present invention addresses such a need.

SUMMARY OF THE INVENTION

The present invention provides a method and system for managing an image related event. In one aspect, the method and system remove an image file on a digital imaging device. The image file is capable of including incompletely processed data. A reference to the image file is stored in a database. The method and system comprise ensuring that removal of the image file will not affect processing of a second image file and removing the reference to the image file from the database. In another aspect, the method and system mount a volume on a digital imaging device. The volume contains an image file capable of including incompletely processed data. In this aspect, the method and system comprise detecting the insertion of the volume, mounting the volume, providing a database including a reference to the image file, and completing image processing of the image file if the image file contains incompletely processed data.

According to the system and method disclosed herein, the present invention allows an image related events to be managed without adversely affecting image processing.

DETAILED DESCRIPTION OF THE INVENTION

Figure 1:
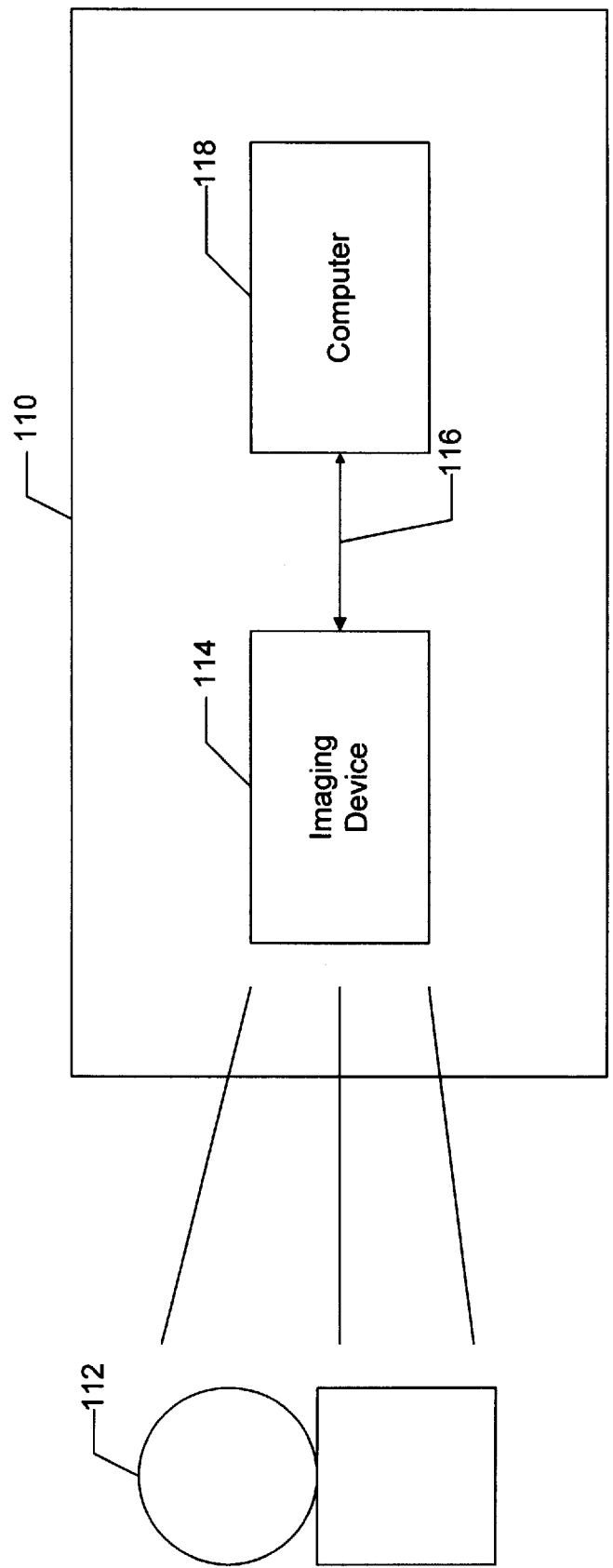
FIG. 1 is a block diagram of a digital camera that operates in accordance with the present invention.

The present invention relates to an improvement in digital imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays images, icons, and/or other items could incorporate the features described hereinbelow and that device would be within the spirit and scope of the present invention. Thus, the present invention is not intended to be limited to the embodiment shown, but is to be accorded the widest scope consistent with the principles and features described herein.

Some conventional digital cameras are capable of storing, accessing, and deleting images on removable media. For example, conventional digital cameras often include a flash disk or other removable memory. Once processing of an image is complete, the conventional digital camera stores a file including the image on the removable memory.

In order to access the removable memory, the removable memory must be mounted. Mounting of a volume, such as a removable memory or a disk, allows the operating software of the conventional digital camera to know that the removable memory exists and to access the removable memory. Once the removable memory is mounted, the digital camera can store images to the removable memory. Unmounting of the volume allows the operating software of the conventional digital camera to know that the removable memory no longer exists and can no longer be accessed.

Although conventional digital cameras can store images on a removable memory, one of ordinary skill in the art will readily recognize that processing is always completed before the removable memory is accessed. Consequently, the removable memory may not be mounted or unmounted while images on the volume are undergoing processing without causing errors. For example, if the user ejects the removable memory during image processing, the image file will be lost. Similarly, if no removable memory is in the conventional digital camera, the conventional digital camera will not capture an image.

In addition, a user may wish to delete an image shortly after the image has been captured. In a conventional camera, however, no action can be taken by a user until after processing of the most recently captured image is completed. As a result, the image is inaccessible until after image processing is completed, preventing a user from aborting processing of an image that is no longer desired.

The present invention provides for a method and system which is capable of mounting and unmounting of a volume containing image files while an image is being processed. The present invention will be described in terms of mounting or unmounting of removable memory for a digital camera. However, one of ordinary skill in the art will readily recognize that this method and system will operate effectively for other types of digital imaging devices and other volumes which may be mounted or unmounted.

FIG. 1 is a block diagram of a digital camera 110 shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data rep resenting object 112. The in captured raw image data is transferred over system bus 116 to computer 118 which performs various image processing functions on the image data before storing it in its internal memory. System bus 116 also passes various status and control signals between imaging device 114 and computer 118.

Figure 2:
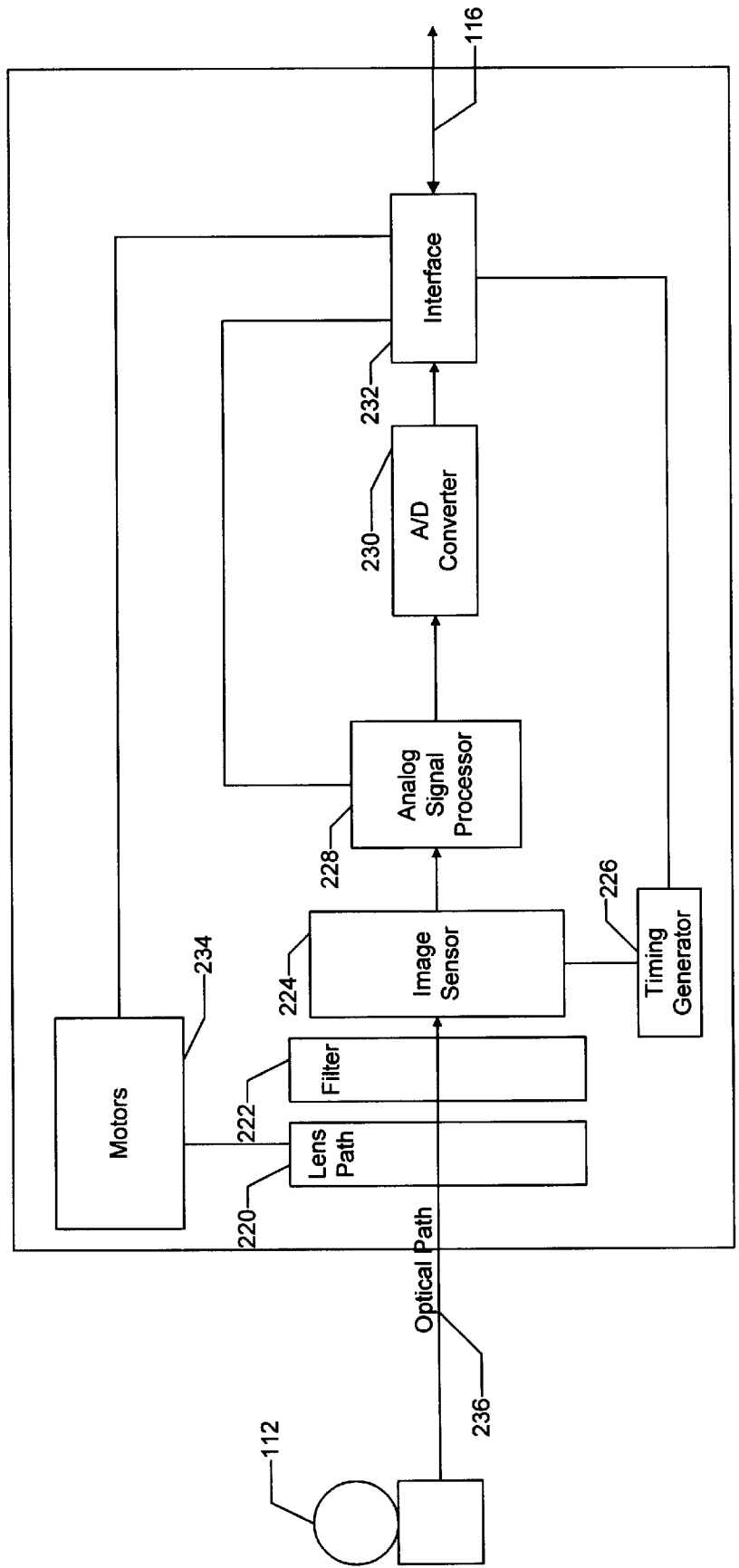
FIG. 2 is a block diagram of one embodiment for the imaging device of FIG. 3.

Referring now to FIG. 2, a block diagram of one embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
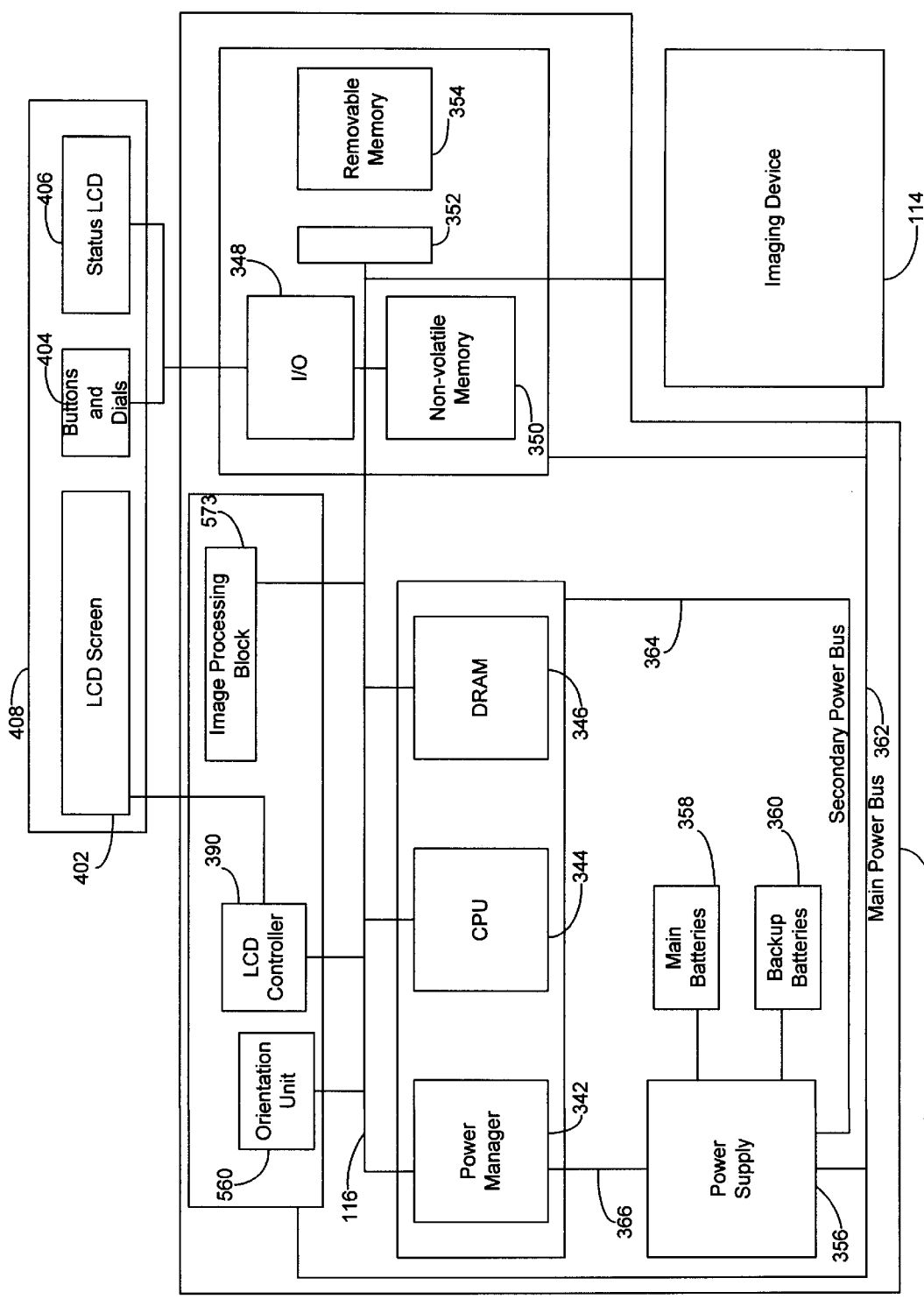
FIG. 3 is a block diagram of one embodiment for the computer of FIG. 2, where image processing is done at least partially in hardware.

Referring now to FIG. 3, a block diagram of one embodiment for computer 118 is shown. In one embodiment, the computer 118 in FIG. 3 provides at least a portion of image processing in hardware using image processing block 573. However, nothing prevents the method and system from being used in a camera 10 which processes image data in software. In such a system, the image processing block 573 would be omitted.

System bus 116 provides connection paths between imaging device 114, an optional power manager 342, CPU 344, dynamic random-access memory (DRAM) 346, input/output interface (I/O) 348, non-volatile memory 350, image processing block 573, orientation unit 560, and buffers/connector 352. Removable memory 354 connects to system bus 116 via buffers/connector 352. Alternately, camera 110 may be implemented without removable memory 354 or buffers/connector 352. The orientation unit 560 can sense which position the digital camera 110 is currently in. The orientation unit 560 also sends signals to the CPU 344 indicating the current orientation of the digital camera 110.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In one embodiment, removable memory 354 is implemented using a flash disk. Power supply 356 supplies operating power to the various components of camera 110. In one embodiment, power supply 356 provides operating power to a main power bus 362 and also to a secondary power bus 364. The main power bus 362 provides power to imaging device 114, I/O 348, non-volatile memory 350, LCD controller 390, orientation sensor 560, image processing chain 573, and removable memory 354. The secondary power bus 364 provides power to power manager 342, CPU 344 and DRAM 346.

Power supply 356 is connected to main batteries 358 and also to backup batteries 360. In one embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
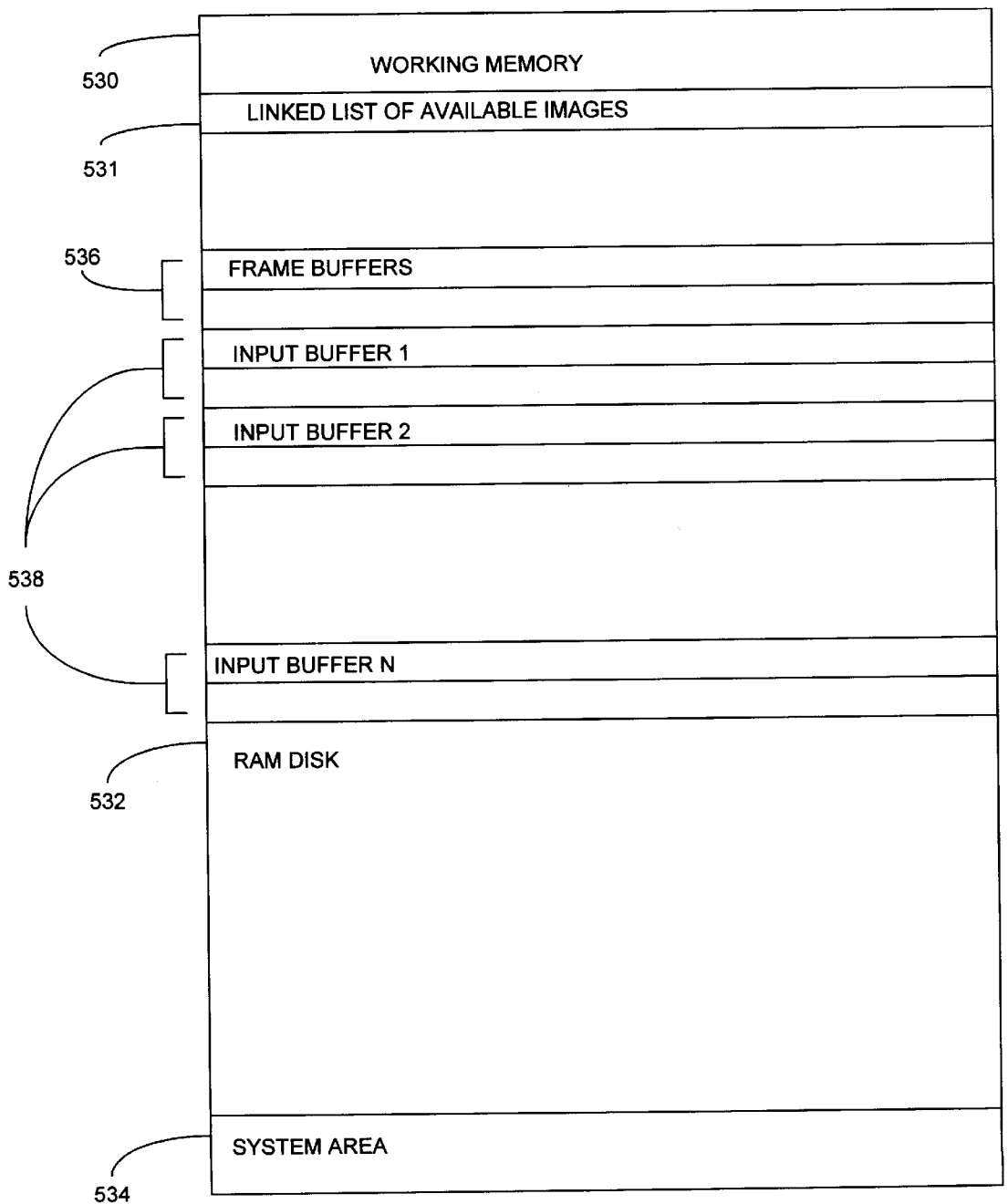
FIG. 4 is a memory map showing one embodiment of the Dynamic Random-Access-Memory (DRAM).

Referring now to FIG. 4, a memory map showing one embodiment of dynamic random-access-memory (DRAM) 346 is shown. In the preferred embodiment, DRAM 346 includes RAM disk 532, a system area 534, and working memory 530.

RAM disk 532 is an optional memory area used for storing raw and compressed image data and typically is organized in a sectored format similar to that of conventional hard disk drives. In one embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes several input buffers or one input buffer 538 for temporarily storing sets of raw image data received from imaging device 114, and a frame buffer 536 for storing data for display on the LCD screen 402. In a preferred embodiment, each input buffer 538 and the frame buffer 536 are split into two separate buffers, called ping-pong buffers (shown by the dashed lines), to improve the display speed of the digital camera and to prevent the tearing of the image in the display 402. The working memory also includes a linked list of available images 531.

Figure 5:
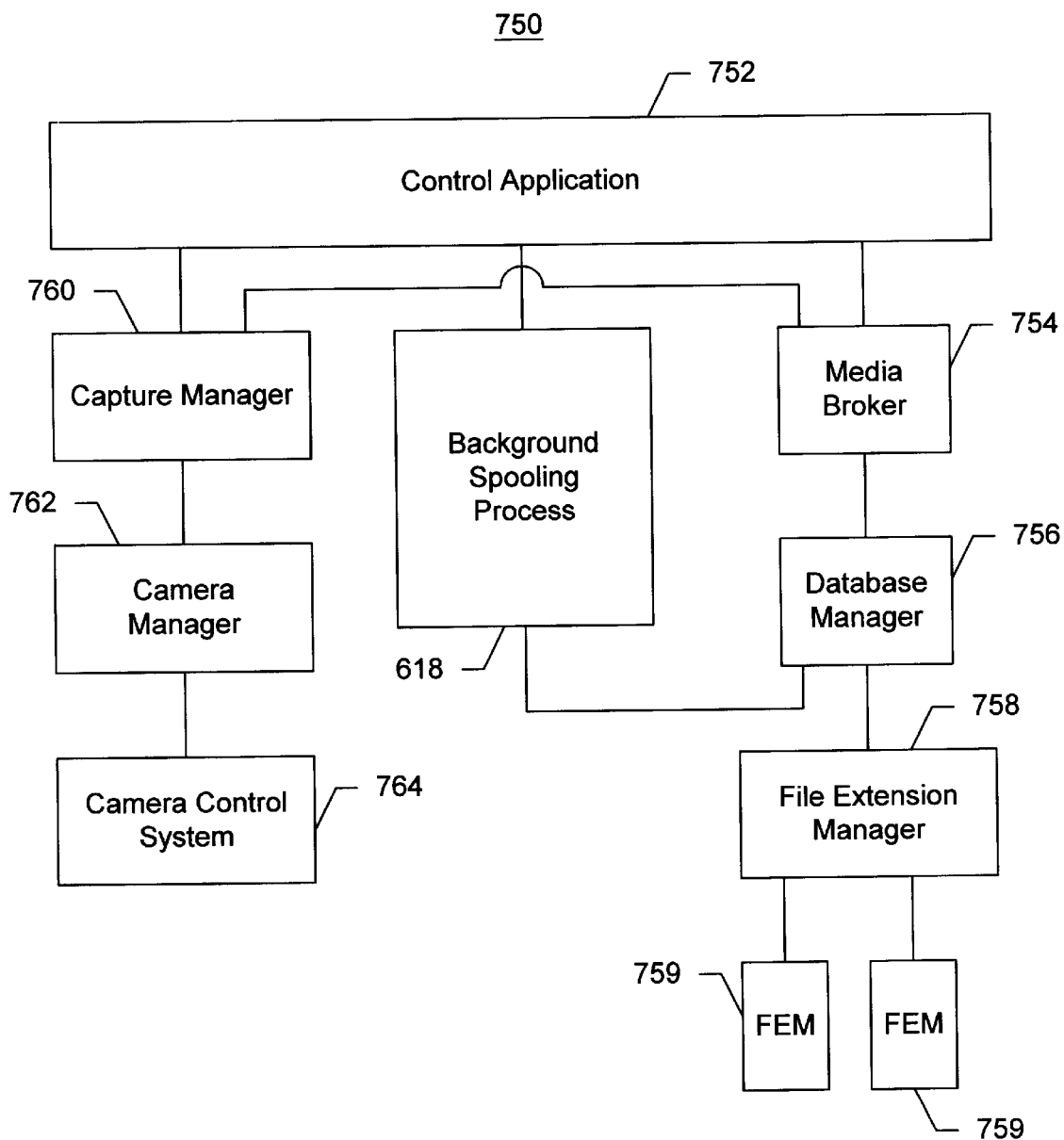
FIG. 5 depicts one embodiment of a portion of the operating software in accordance with the present invention.

FIG. 5 depicts one embodiment 750 of a portion of the operating software of the present invention. The control application 752 controls the camera 110 by communicating with the capture manager 760, the background spooling process 618, and the media broker 754. When an image is to be captured, the control application 752 notifies the capture manager 760. The capture manager 760 communicates with the camera manager 762 which provides handshaking with the camera control system 764. The camera control system 764 communicates with the necessary hardware and returns the data to the camera manager 762.

When the image data is returned, the capture manager 760 notifies the media broker 754. The media broker 754 sorts and controls the image files. The control application 752 determines which images should be shown to the user at a given time. The media broker 754 notifies the database manager 756, which controls a database of image files, of the unprocessed image data. The image database includes a reference to the image file (hereinafter referred to as an image in the image database). The database manager 756 accesses the background spooling process 618 to allow the image data to be processed.

When image processing is completed, the background spooling process 618 notifies the control application 752. The control application 752 notifies the media broker 754 that image processing is complete. The media broker 754 accesses tie database manager 756 which updates the image database. File extension manager 758 conjunction with file extension modules ("FEMs") 759 are capable of placing the image data in a particular image file format. Operation of the file extension manager 758 and FEMs 759 is described more fully in U.S. patent application Ser. No. 08/978,794 entitled "METHOD AND SYSTEM FOR EXTENDING THE AVAILABLE IMAGE FILE FORMATS IN AN IMAGE CAPTURE DEVICE" filed on Nov. 26, 1997 and assigner to the assignee of the present invention. Applicant hereby incorporates by reference the above-mentioned co-pending application.

Figure 6:
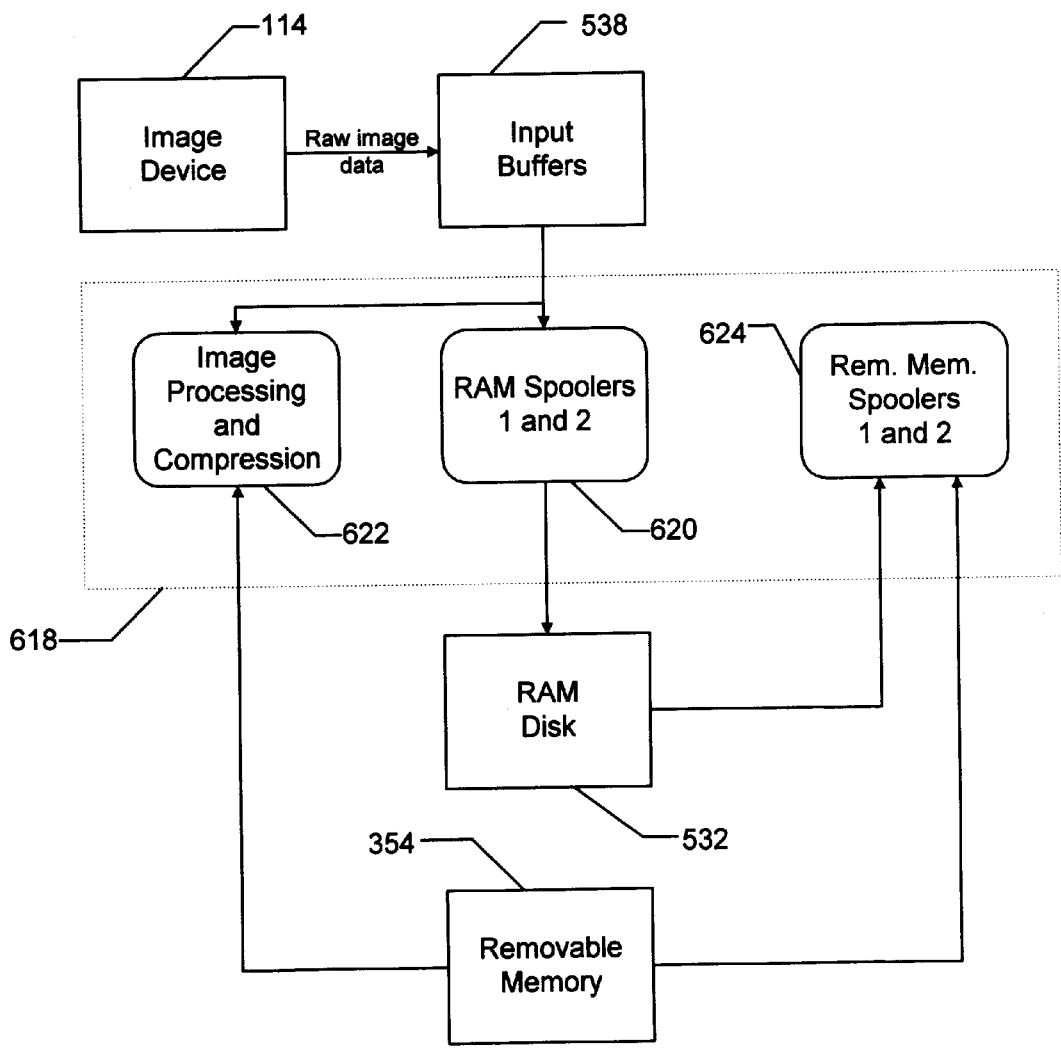
FIG. 6 is a block diagram illustrating the image file generation process where image processing is performed by software, which begins when the camera is in capture mode and the user presses a shutter button to capture an image.

To more particularly illustrate image processing, refer to FIG. 6, depicting a block diagram of one embodiment of a portion of the image file generation process. The image file generation process begins when the camera is in capture mode and the user presses a shutter button (not shown) to capture an image. The raw image data is captured by the CCD array 224 in the image device 114 at a resolution set by the user and the raw image data is stored into an appropriate number of input buffers 538. In a preferred embodiment, the raw image data is transferred from the CCD array 224 to the input buffers 538.

The raw data in input buffers 538 is transferred to background spooling 618 process for image processing and storage. As used herein, a spooler is a process that transfers data from one process or device to a second process or device. The primary purpose of the background spooling process 618 is to move data out of the input buffers 538 as fast as possible in order to free the input buffers 538 to capture another image. After the data is moved, the data is processed in the background. This allows the next image to be captured before the previous image is processed and compressed, which increases the capture rate of the digital camera.

Figure 7:
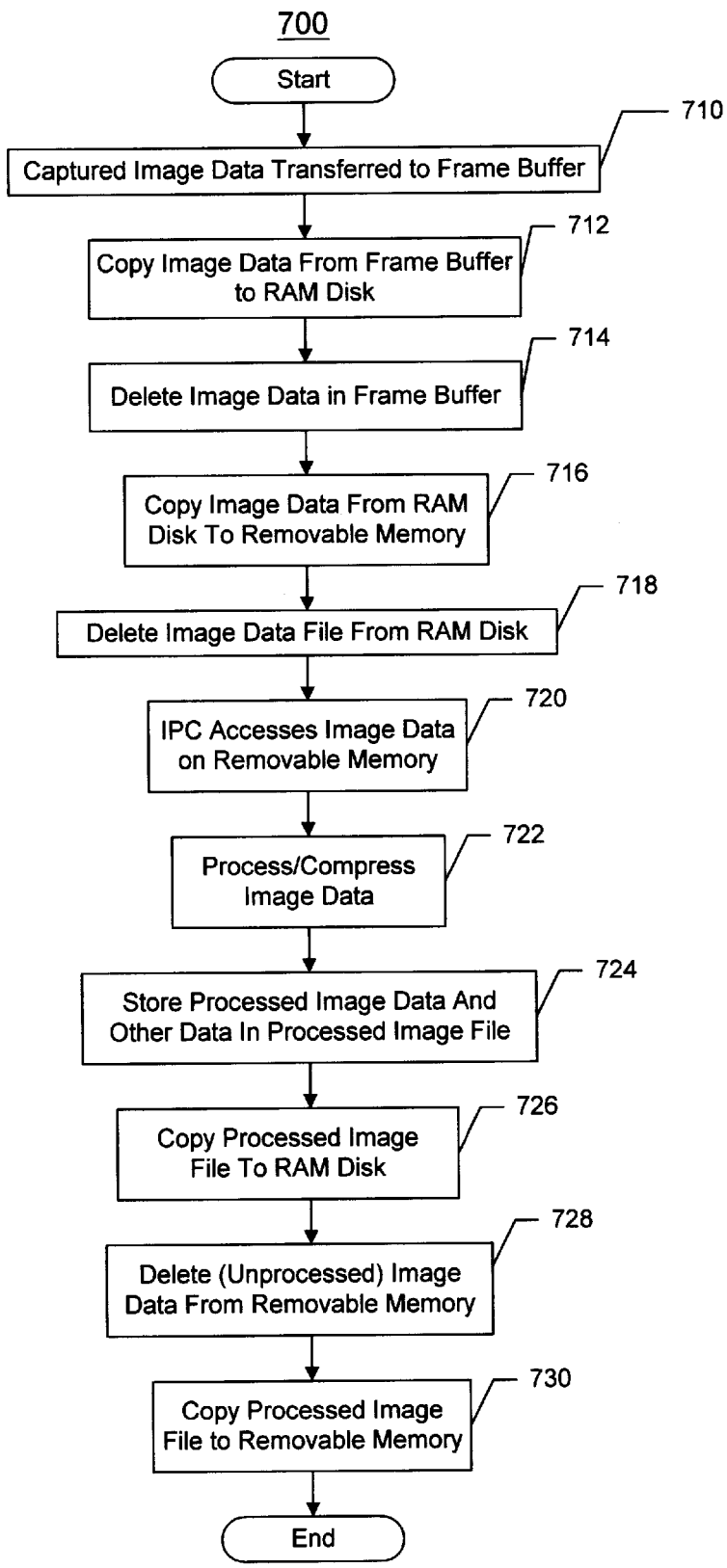
FIG. 7 is a flow chart showing one method for processing an image.

To more particularly describe the background spooling process 618, refer now to FIG. 7 depicting a flow chart of a simplified method 700 for processing image data using the background spooling process 618. A more detailed description of the interaction between the elements of the camera 110 during image processing is contained in U.S. patent application Ser. No. 08/735,286 entitled "System and Method For Correlating Processing Data and Image Data Within a Digital Camera Device" filed on Oct. 23, 1996 and assigned to the assignee of the present application. Applicant hereby incorporates by reference the above-mentioned co-pending applications.

Initially, the camera 110 captures a selected image and transfers the image data to the frame buffers 536 in step 710. The Ram Spooler 1 620 then copies the image data from the frame buffers 536 to the RAM disk 532 via step 712 to create an image data file. In one embodiment, other data used in image processing is also placed in the image data file. The RAM spooler 1 620 then deletes the image data from the frame buffers 536 in step 714. The removable memory spooler 1 624 then copies the image data file from the RAM disk 532 to the removable memory 354 via step 716. The removable memory spooler 1 624 then deletes the image data file from the RAM disk 532 in step 718.

The image processing and compression ("IPC") 622 then accesses the image data stored in the removable memory 624 via step 720. The IPC 622 then proceeds to process and compress the image data in step 722. The IPC 622 then stores the processed and compressed image data in a processed image data file via step 724. If space is available, the processed image data file is stored in the RAM disk 532. If insufficient space is available, then the processed image data file is temporarily stored in another available location, such as in working memory 530. In addition to processed and compressed image data, the processed image data file may include other information including, but not limited to the image name, image type, image size, and image capture settings.

If in step 724 the processed image file was stored in memory other than the RAM disk 532, then in step 726 the RAM spooler 2 620 copies the processed image file to the RAM disk 532. If the image file was successfully copied, the IPC 622 deletes the unprocessed image data from the removable memory 354 via step 728. The removable memory spooler 2 624 then copies the processed image file to the removable memory 354 via step 730. The image file is then deleted from the RAM disk 532 via step 731. Although the method 700 illustrates image processing for a single image, nothing prevents the method and system from processing a plurality of images. In such a case, each image would typically be undergoing a different stage in processing. In addition, depending on the memory available, the method for processing the data used by the spooling process 618 may vary from the method 700.

The method 700 for processing and image is carried on in the background. Consequently, the user is free to operate the camera during image processing. The user may initiate a number of image related events while multiple tasks are accessing an image file. For example, during image processing a user might take out one removable memory 354 and replace it with another removable memory 354. The removable memory 354 may contain data for an image currently undergoing processing. The removable memory 354 may contain uncompressed image data that has not yet been accessed by the IPC 622. Removal of this data should not adversely affect the processing of other images by the spooling process 618. In addition, if a removable memory 354 having image data that is incompletely processed is placed in the camera 110, the spooling process 618 should be able to complete processing of the image. The user may also decide to delete an image file being processed. Aborting image processing in this manner should not adversely affect processing of other images.

The present invention manages image related events without compromising image processing. The image related events include deleting an image which has not completed processing and mounting or unmounting of a volume, such as the removable memory 354, in a digital imaging device where the volume contains images that have not completed processing.

Figure 8A:
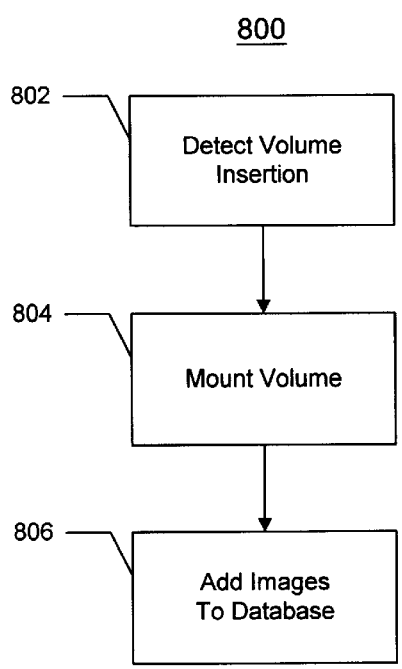
FIG. 8A is a flow chart of one method for mounting a volume.
Figure 8B:
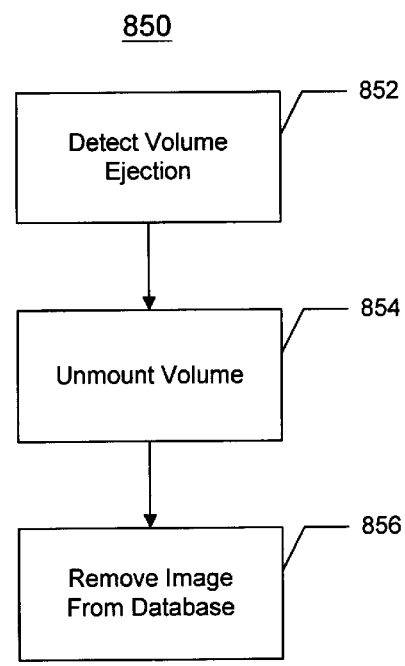
FIG. 8B is a flow chart of one method for unmounting a volume.

To more particularly illustrate the method and system in accordance with the present invention, refer now to FIGS. 8A and 8B depicting a flow chart of a simplified method for mounting a volume or unmounting a volume, respectively.

In a preferred embodiment, the volume being mounted or unmounted is the removable memory 354. FIG. 8A depicts a method 800 for mounting a volume. The insertion of a volume is detected via step 802. In one embodiment, when a volume is inserted an electrical signal generates an interrupt. This interrupt notifies the camera 110 that a volume is to be mounted. The volume is then mounted via step 804. The volume mounting step 804 provides the route or pointer for the volume to the operating software of the camera 110. This makes the operating software aware of the existence of the volume and capable of accessing files in the volume.

Via step 806, the image is added to an existing database. The existing database could be a null database, for example when the camera is just started up or when no images have been stored or captured. The camera 110 maintains a database of the available images. The image database contains a list of all images captured, including those still undergoing image processing. In one embodiment, the image database is a sortable, ordered linked list of images 531, as depicted in FIG. 4, and is controlled by the database manager 756.

Figure 9A:
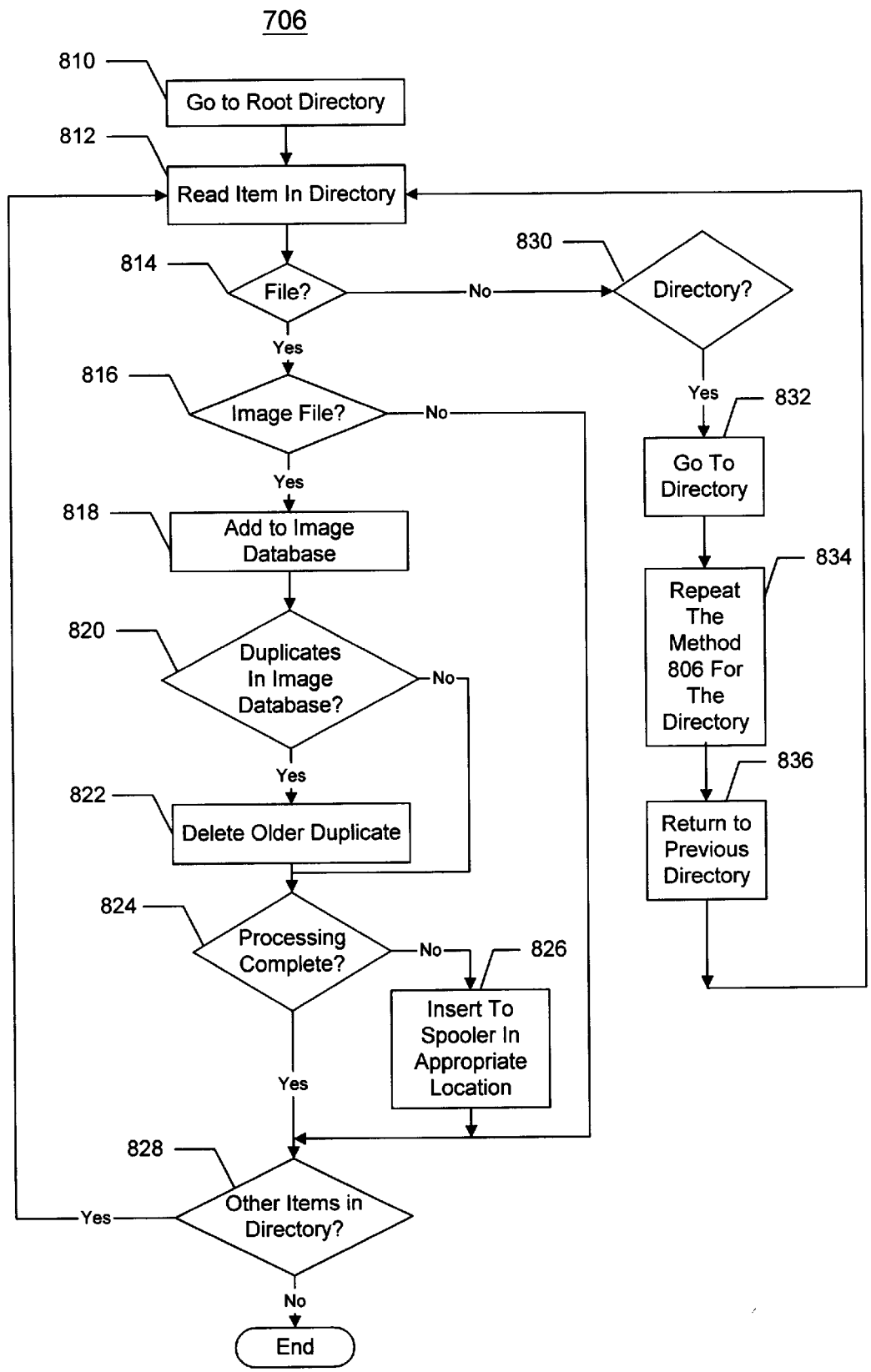
FIG. 9A is a flow chart depicting one method for providing the image files on a volume being mounted to a database of image files.

FIG. 9A is a flow chart depicting one method used by the camera 110 to carry out the step 806 of adding images on a volume being mounted to the image database. Although the method 806 depicts the step 810 through 826 occurring in a particular order, the method 806 can function where many steps occur in another order. In a preferred embodiment, the removal of duplicate images files in step 822, discussed below, could occur after all files containing image data have been added to the image database.

The root directory of the volume being mounted is accessed via step 810. Note that in some embodiments, this initial directory may be other than the root directory. The method 806 can be started from any directory. The reading the contents of the directory then commences by reading an item in the directory via step 812. In a preferred embodiment, the contents of a directory are read in the order in which they were written to the volume. However, nothing prevents the contents of the directory from being read in another order. In the preferred embodiment, adding the image to the database will include adding the pathname of the file to the database.

It is then determined in step 814 if the item is a file. If the item is a file then in step 816 it is determined if the file is an image file. In a preferred embodiment, the three character string ".XXX" at the end of a file name determines whether the file is a recognizable image file. In a preferred embodiment, the camera 110 can read and write a number of different image file types. In the preferred embodiment, these file types are recognizable using the three character string. For example, in the preferred embodiment, .JPG indicates that the file is an image file including a compressed JPEG image. Also in the preferred embodiment, .CFA indicates that the file contains unprocessed image data as well as a thumbnail and a screennail. A thumbnail image is typically a small uncompressed, lower resolution version of the image data. A screennail is a medium-resolution version of the image and in a preferred embodiment is also compressed, although compressing the screennail is optional. The camera 110, therefore, recognizes both .JPG and .CFA as files which include image data. Thus, it is determined whether or not the file is an image.

If the file is not a recognizable image, then the image database is not updated. If the file is an image file, then the image database is updated via step 818 by adding an image to the image database.

It is determined via step 820 if there are duplicates of the image in the image database. Duplicates could exist where the removable memory 354 was removed during image processing. For example, it is possible to have an image file including uncompressed data in the removable memory and an image file for the same image having compressed data in RAM if the removable memory 354 was taken out between step 724 and 726 of the method 700. In a preferred embodiment, the determination of whether duplicates exist can be made using the image name, serial number, and other data in the image file. In one embodiment, the determination of whether duplicates exist and which duplicate is older is made based on the three character extension for the image file. An image file having a .CFA extension is older than an image file having an extension which indicates that image processing has completed. If there are duplicates, for example JPEG and .CFA files, then the JPEG image file is deleted via step 822. The image file containing unprocessed data, for example the .CFA file, is sent back through the system for processing to regenerate an image file containing processed data. Thus, a newer file residing in the memory of the digital camera 110 is retained.

It is then determined if processing is complete via step 824. If image processing is complete then the method 806 skips to step 828. However, if image processing is not complete, then via step 822 the image file is inserted into the spooling process 618 at the correct point. In one embodiment, image files are saved on a removable memory 354 only at the start and finish of image processing. Thus, an image file will be reinserted into the method 700 at the beginning of the IPC 622. In another embodiment, the image files may be saved to the removable memory 354 at various points in processing. In such an embodiment, the image file will be reinserted into the IPC 622 at the appropriate place. Thus, the image file is placed in the appropriate step in the method 700. It is then determined whether more unread items are in the directory via step 828. If there are no unread items in the directory, then the method 806 ends.

If in step 814 it is determined that the item read is not a file, then it is determined if the item is a directory in step 830. If the item is a directory, then it is accessed via step 832. This directory is traversed in step 834, which repeats the method 706 starting at step 812 for that directory. When the directory and any subdirectories have been traversed, the images for each directory and subdirectory have been added to the image database, and the appropriate place to restart image processing restored, then the previous directory is returned to via step 836 and the next item read in step 812. Note that this is a recursive process because the directory structure may be multiple layers deep. Therefore, step 812 reads an item in the previous directory level when step 812 is returned to from step 836.

In a preferred embodiment, flags are used to determine whether processing is complete and, if processing is not complete, at which step of the method 700 at which processing is currently being performed. In a preferred embodiment, the flags are located in the image database along with the image. The flags are set based on the three character string and where the image file is stored. For example, one flag is "JPG RM". The "JPG RM" flag is set when the image file contains JPEG data and resides in the removable memory 354. Another flag, "CFA RM" is set when the image file includes unprocessed data and resides in the removable memory 354.

As a result of the method 706, volumes having files containing images that have not completed processing can be mounted. Once the volume is mounted, the processing of the image files can be completed.

Refer back to FIG. 8B which depicts the method 850 for unmounting a volume. The ejection of the volume is detected via step 852. In one embodiment, an electrical signal generates an interrupt when a volume is ejected. This interrupt notifies the camera 110 that a volume is to be unmounted. The volume is then unmounted via step 854, making the image files on the unmounted volume inaccessible to the operating software. The images in the volume being unmounted are then removed from the image database in step 856.

Figure 9B:
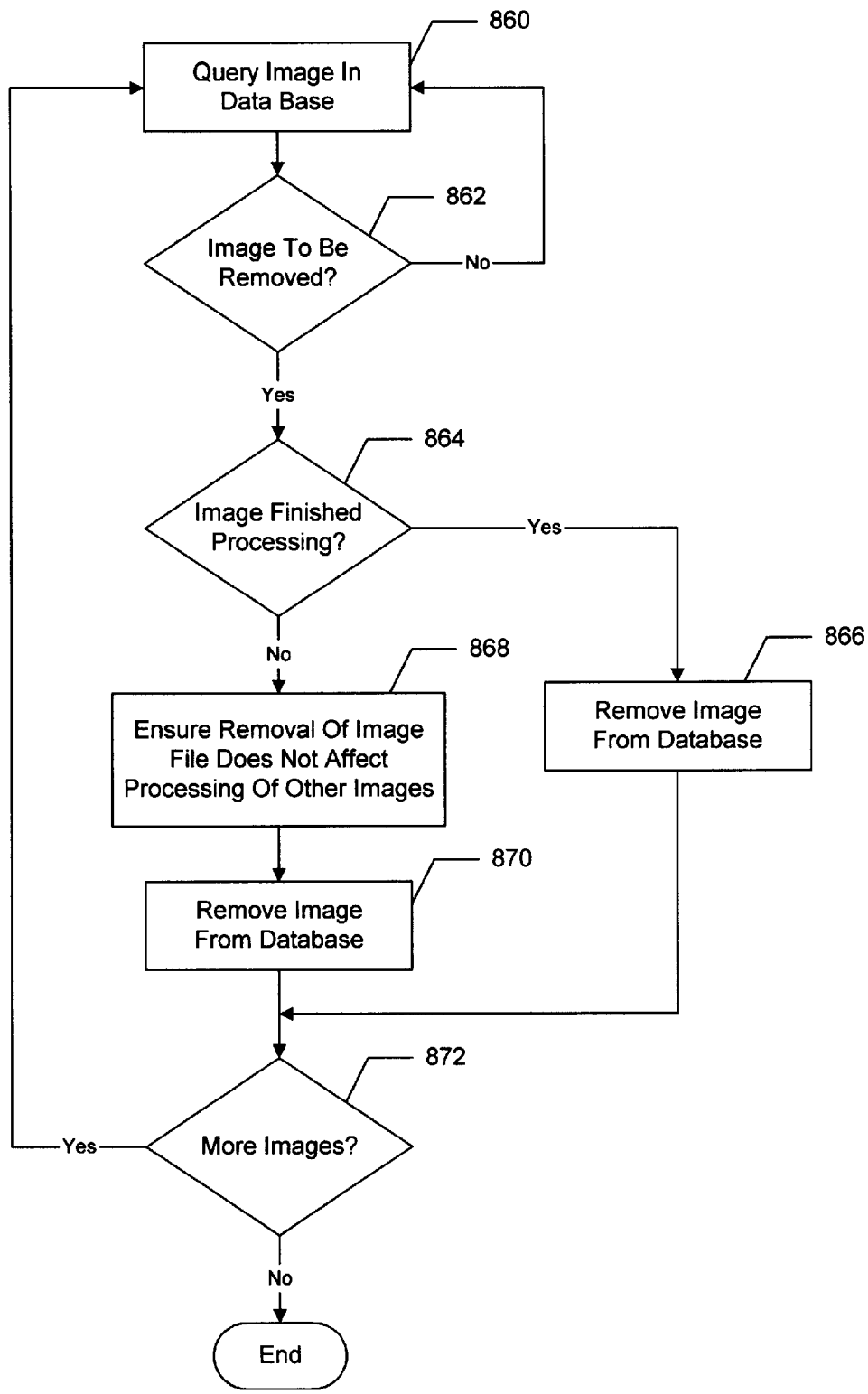
FIG. 9B is a flow chart of one method for removing image files on a volume being unmounted from a database of image file.

FIG. 9B is a flow chart depicting one method used by the camera 10 to carry out the step 856 of removing from the image database images for image files on a volume being unmounted. An image in the image database is queried via step 860. It is then determined in step 862 if the image is to be removed because the volume containing the image file is being unmounted. If the image is not to be removed, then the another image is accessed via step 860.

If the image is to be removed, then it is determined if the image data have completed processing via step 864. In a preferred embodiment, step 864 is performed by determining if the three character extension indicates that the image data have completed processing. In a preferred embodiment, a three character extension of .CFA indicates that the image data have not completed processing. Also in a preferred embodiment, if the three character extension is .JPG or other extension used for compressed image file, the image data have completed processing. If the image data have completed processing, then the image is removed from the database via step 864.

If the image data have not completed processing, then in step 868 it is ensured that unmounting of the volume containing the image file will not adversely affect the processing of other image data. In a preferred embodiment, step 868 is performed by setting a "STOP PROCESSING" flag. In this embodiment, unmounting of tie volume causes the database manager 756 to set the "STOP PROCESSING" flag for the image. As discussed below, setting this flag allows the image file to be removed from the camera 110 without adversely affecting the spooling process 618. After processing has stopped and the flag in the database indicates completion of the stop processing request, the image is removed from the database in step 870. It is then determined if there are more images in the database that have not been queried via step 872. If there are more images, then another image is queried via step 860. Otherwise, the method 856 terminates. Note that this process does not wait for processing to be completed. It sets the flag when processing is aborted in the IPC 622. The image is then deleted from the database, as described below.

Setting the "STOP PROCESSING" flag in the step 868 allows the image file currently being processed to be removed from the camera 110 without adversely affecting the processing of other images. In a preferred embodiment, when the "STOP PROCESSING" flag is set, image processing can be terminated at the next read or write without compromising processing of other images. In this embodiment, a command can be sent to the spooling process 618 indicating that processing is completed early. In an alternate embodiment, image processing will be completed in the following manner. Referring back to FIG. 7, in this embodiment, before a step in the method 700 is performed, the "STOP PROCESSING" flag is queried. If the "STOP PROCESSING" flag is set, then the step will be aborted and the file will be passed on to the next step in the method 700. At each subsequent step, the "STOP PROCESSING" flag will be queried, and the step aborted. Steps which are completed and aborted are indicated by flags in the image database. This means that in this embodiment, image data is passed through the IPC 622, with each step being aborted.

For example, suppose an image file containing unprocessed image data resides in the removable memory 354. Thus, the step 716 of copying the image data to the removable memory has been completed for the image file. If the removable memory 354 is removed, the "STOP PROCESSING" flag will be set for the image via step 868 of the method 856. When the image file to be removed is accessed again in step 720 by the IPC, it is first determined that the "STOP PROCESSING" flag has been set in the image database. Consequently, the step 720 will be aborted and step 722 wilt be commenced. Because the "STOP PROCESSING" flag is still set, step 722 will also be aborted. This process of determining that the "STOP PROCESSING" flag has been set, aborting the step and moving to the next step continues through step 730 of the method 700. Each step in the method 700 for image processing sets the appropriate completion flag. When the last step in the method 700 is completed, the background spooling process 618 notifies the control application 752. The database manager 756 is then notified through the media broker 754 that the data has cleared the background spooling process 618. In one embodiment, the database manager 756 is notified by setting a last flag in the database 531 indicating that processing has been completed. When the last flag is set indicating that the image data have cleared the spooling process 618, the database record for the image located on the removable memory 354 is removed.

If the removable memory 354 is taken out while data is being written to the removable memory 354, for example during step 716, an error will be noted and the processing for that image will be stopped without adversel) affecting the processing of other images. If the removable memory 354 is removed during writing, the volume will be unmounted as discussed above. This causes the "STOP PROCESSING" flag to be set. The next read of the image file will generate an error. This error in conjunction with the "STOP PROCESSING" flag will terminate processing of the image file on the volume that was unmounted. The combination of the "STOP PROCESSING" flag and the error will, however, not prevent other images in the spooling process 618 from being processed.

Because the "STOP PROCESSING" flag is set, an image file can be removed during image processing without affecting the processing of other images. Consequently, a volume containing image files that have not completed image processing can be unmounted.

Figure 10:
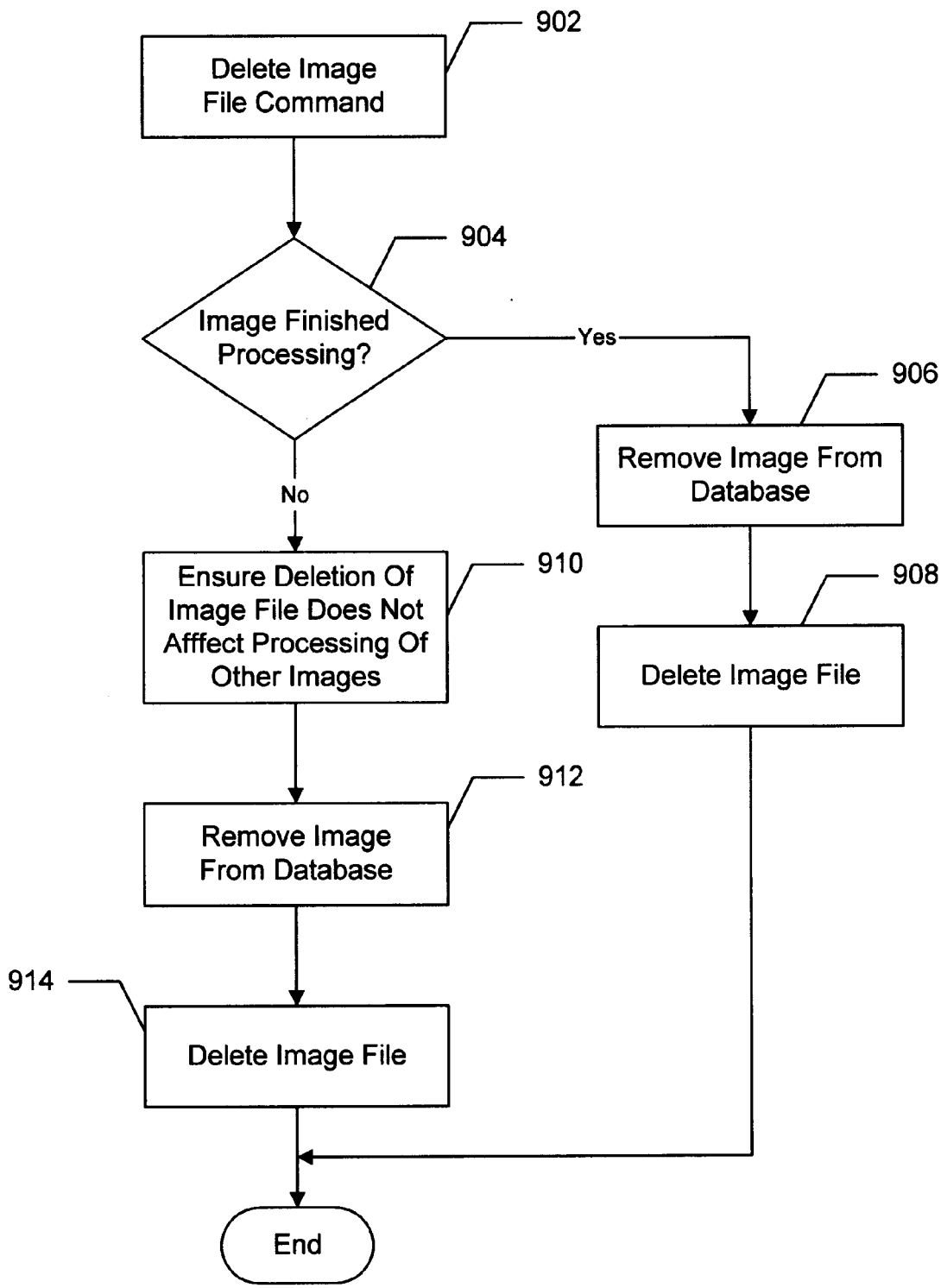
FIG. 10 is a flow chart of one method for deleting an image file while the image file may be undergoing image processing.

An image can also be deleted during image processing using flags as discussed with respect to removal of an image from the image database. FIG. 10 depicts a method 900 for deleting an image file. The user first issues a command to delete the image via step 902. In one embodiment, the delete command causes the control application 752 to access the media broker 754. The media broker 754 then accesses the database manager 756, which sets a "DELETE" flag, as discussed below. In one embodiment, the media broker 754 also causes the control application 752 to update the user interface, removing the deleted image file from a list of images shown to the user.

It is then determined if the image file has finished processing via step 904. In a preferred embodiment, whether the image file has completed processing is determined using the three character extension of the image file name. For example, a .CFA extension indicates a file has not finished processing, while a .JPG extension indicates file has finished processing. If the image file has finished processing, the corresponding image is removed from the image database via step 906. Once the image has been removed from the database, the image file is actually deleted via step 908.

If the image data has not completed processing, then it is ensured that deletion of the image file will not affect the processing of other images via step 910. In one embodiment, the step 910 is performed using a "DELETE" flag, as discussed below. The image is then removed from the image database and the image file deleted via steps 902 and 914, respectively. Thus, the image is removed from the database and the image file is deleted, for example from the removable memory 354, without compromising processing of other image data.

In one embodiment, setting "DELETE" flag allows the image file to be deleted without adversely affecting the spooling process 618. In one embodiment, the "DELETE" flag functions similarly to the "STOP PROCESSING" flag. In such an embodiment, the "DELETE" flag also provides the function of deleting the image from the database.

In a preferred embodiment, when the "DELETE" flag is set, image processing can be terminated at the next read or write without compromising processing of other image data. In this embodiment, a command can be sent to the spooling process 618 indicating that processing is completed early. In an alternate embodiment, image processing will be completed in the following manner. Referring back to FIG. 7, in this embodiment, before a step in the method 700 is performed, the "DELETE" flag is queried. If the "DELETE" flag is set, then the step will be aborted and the image file will be passed on to the next step in the method 700. This means that the current step will complete. At each subsequent step, the "DELETE" flag will be queried, and the step aborted. Steps which are completed and aborted are indicated by flags in the database.

For example, suppose an image file containing unprocessed image data resides in the removable memory 354. Thus, the step 716 of copying the image data to the removable memory has been completed for the image file. If the user orders the file to be deleted, the "DELETE" flag will be set for the image file via step 910 of the method 900. When the image file to be removed is accessed again in step 720 by the IPC, it is first determined that the "DELETE" flag has been set. Consequently, the step 720 will be aborted and step 722 will be commenced. Because the "DELETE" flag is still set, step 722 will also be aborted. This process of determining that the "DELETE" flag has been set, aborting the step and moving to the next step continues through step 730 of the method 700.

Each step in the method 700 for image processing sets the appropriate completion flag. When the last step in the method 700 is completed, the background spooling process 618 notifies the control application 752. The database manager 756 is then notified through the media broker 754 that the data have cleared the background spooling process 618. In one embodiment, the database manager 756 is notified by setting a last flag in the database 531 indicating that processing has been completed. When the last flag is set indicating that the image file has cleared the spooling process 618, the database record for the image is removed and the image file is deleted from the removable memory 354. Because the "DELETE" flag is set, an image file can be deleted during image processing without affecting the processing of other images.

Although the "DELETE" flag has been described as providing similar functions to the "STOP PROCESSING" flag as well as allowing for the image file to be deleted, nothing prevents the use of a "DELETE" flag in another manner. For example, in an alternate embodiment, setting the "STOP PROCESSING" flag could indicate the unmounting of a volume, allowing for the image to be removed from the image database. Setting both the "STOP PROCESSING" flag and the "DELETE" flag could indicate that the user wishes to delete the image file, resulting in the image being removed from the database and the image file being deleted, for example from removable memory 354.

A method and system has been disclosed for managing image related events including mounting or unmounting of a volume containing image files which have not completed processing and aborting processing of an image. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for removing an image file on a digital imaging device, a reference to the image file being stored in a database on the digital imaging device, the method comprising the steps of:

allowing a user to remove the image file, the image file capable of having image data which is incompletely processed;

ensuring that removal of the image file by the user will not affect processing of a second image file; and removing the reference to the image file from the database.

2. The method of claim 1 further comprising the step of:

deleting the image file.

3. The method of claim 2 wherein the step ensuring that removal of the image file will not affect processing of a second image file flirter includes the step of ensuring that removal of the image file will not affect processing of a second image file when the image file contains incompletely processed data, and the method further comprises the step of:

determining if the image file contains incompletely processed data.

4. The method of claim 3 wherein the step of ensuring that removal of the image file will not affect processing of the second image file when the image file contains incompletely processed data filter includes the step of:

setting a delete flag.

5. The method of claim 4 wherein the image file further has a name having a three character extension and wherein the step of determining if the image file contains incompletely processed data further comprises the step of:

determining if the three character extension indicates the image file contains incompletely processed data.

6. The method of claim 5 wherein the digital imaging device is a digital camera.

7. The method of claim 1 wherein the image file is stored on a volume, the method further comprising the steps of:

detecting ejection of the volume if the user removes the image file by removing the volume; and unmounting the volume.

8. The method of claim 7 wherein the step of ensuring that removal of the image file will not affect processing of a second image file further includes the step of ensuring that removal of the image file will not affect processing of a second image file when the image file contains incompletely processed data and the method further comprises the step of:

determining if the image file contains incompletely processed data.

9. The method of claim 8 wherein the step of ensuring that removal of the image file will not affect processing of a second image file if the image file contains incompletely processed data further includes the step of:

setting a stop processing flag.

10. The method of claim 9 wherein the image file further has a name having a three character extension and wherein the step of determining if the image file contains incompletely processed data further comprises the step of:

determining the three character extension indicates the image file contains incompletely processed data.

11. The method of claim 10 wherein digital imaging device further includes a removable memory; and wherein the volume is a removable memory.

12. The method of claim 11 wherein the digital imaging device is a digital camera.

13. The method of claim 12 wherein the database is a sortable linked list of a plurality of available images.

14. The method of claim 1 wherein the image file contains the image data that is incompletely processed.

15. The method of claim 1 wherein the ensuring step further includes the step of:

ensuring that removal of the image file by the user will not result in loss of the image data.

16. A method for mounting a volume on a digital imaging device, the volume containing an image file, the method comprising the steps of:

detecting the insertion of the volume;

mounting the volume;

providing a database including a reference to the image file;

determining if the image file contains incompletely processed data; and completing image processing of the image file if the image file contains incompletely processed data.

17. The method of claim 16 wherein the volume further includes a plurality of items; and wherein the database providing step further includes the step of:

determining if an item of the plurality of items is a file.

18. The method of claim 17 wherein the database providing step further includes the step of:

determining if the item on the volume is the image file if the item is a file.

19. The method of claim 18 wherein the database providing step further includes the steps of:

determining if a duplicate file of the image file exists; and of the duplicate file and the image file, retaining only a newer file residing on the digital imaging device.

20. The method of claim 19 wherein the image file further has a name having a three character extension and wherein the step of determining if the image file contains incompletely processed data further comprises the step of:

determining the three character extension indicates the image file contains incompletely processed data.

21. The method of claim 20 wherein the step of determining if the image file contains incompletely processed data further includes the steps of:

determining if the image file has completed processing; and providing the incompletely processed data to a first stage of the plurality of stages.

22. The method of claim 20 wherein the step of determining if the image file contains incompletely processed data further includes the steps of:

determining a completed stage of a plurality of processing stages that the incompletely processed data having finished; and providing the incompletely processed data to a next stage of the plurality of stages, the next stage being immediately after the complete stage.

23. The method of claim 21 wherein the digital imaging device is a digital camera.

24. The method of claim 23 wherein the volume further includes a removable memory.

25. The method of claim 24 wherein the database is a sortable linked list of a plurality of available images.

26. A method for removing an image file on a digital camera, the image file having a file name, a reference to the image file being stored in a database on the digital imaging device, the method comprising the steps of:

allowing a user to remove the image file, the image file capable of having image data which is incompletely processed;

ensuring that removal of the image file by the user will not affect processing of a second image file when the image file contains incompletely processed data, including the steps of using a filename extension to indicate that the image file contains incompletely processed data;

setting a flag if the image contains incompletely processed data; and at each step in image processing, stopping processing if the flag is set; and removing the reference to the image file from the database.

27. The method of claim 26 wherein the image file contains the image data that is incompletely processed.

28. The method of claim 26 wherein the ensuring step further includes the step of:

ensuring that removal of the image file by the user will not result in loss of the image data.

29. A method for mounting a volume on a digital camera, the volume containing a plurality of items, one of the plurality of items being an image file, the method comprising the steps of:

detecting the insertion of the volume;

mounting the volume;

providing a database including a reference to the image file; and completing image processing of the image file if the image file contains incompletely processed data, the data processing completing step further including the steps of;

determining if an item of the plurality of items is the image file and if the item is the image file then performing the following steps;

determining if the image file contains incompletely processed data;

determining a three character extension indicates the image file contains incompletely processed data;

determining if a duplicate file of the image file exists; of the duplicate file and the image file, retaining only a newer file residing on the digital imaging device; and providing the incompletely processed data to a first stage of the plurality of stages.

30. A system for removing an image file on a digital imaging device, a reference to the image file being stored in a database on the digital imaging device, the system comprising:

means for allowing a user to remove the image file, the image file capable of having image data which is incompletely processed;

means for ensuring that removal of the image file by the user will not affect processing of a second image file; and means for removing the reference to the image file from tie database.

31. The system of claim 30 further comprising:

means for deleting the image file.

32. The system of claim 31 wherein the means for ensuring that removal of the image file will not affect processing of a second image file further include means for ensuring that removal of the image file will not affect processing of a second image file when the image file contains incompletely processed data and the system further comprises:

means for determining if the image file contains incompletely processed data.

33. The system of claim 32 wherein the means for ensuring that removal of the image file will not affect processing of the second image file when the image file contains incompletely processed data filter includes means for setting a delete flag.

34. The system of claim 33 wherein the image file further has a name having a three character extension and wherein the means for determining if the image file contains incompletely processed data Fuhrer comprise:

means for determining the three character extension indicates the image file contains incompletely processed data.

35. The system of claim 34 wherein the digital imaging device is a digital camera.

36. The system of claim 35 wherein the image file is stored on a volume, the system further comprising:

means for detecting ejection of the volume if the user removes the image file by removing the volume; and means for unmounting the volume.

37. The system of claim 36 wherein the means for ensuring that removal of the image file will not affect processing of a second image file further include means for ensuring that removal of the image file will not affect processing of a second image file when the image file contains incompletely processed data said the system further comprises:

means for determining if the image file contains incompletely processed data.

38. The system of claim 37 wherein the means for ensuring that removal of the image file will not affect processing of a second image file if the image file contains incompletely processed data further include:

means for setting a stop processing flag.

39. The system of claim 38 wherein the image file further has a name having a three character extension and wherein the means for determining if the image file contains incompletely processed data further comprise means for determining the three character extension indicates the image file contains incompletely processed data.

40. The system of claim 39 wherein digital imaging device further includes a removable memory and wherein the volume is a removable memory.

41. The system of claim 40 wherein the digital imaging device is a digital camera.

42. The system of claim 41 wherein the database is a sortable linked list of a plurality of available images.

43. The system of claim 30 wherein the image file contains the image data that is incompletely processed.

44. The system of claim 30 wherein the ensuring means further includes:

means for ensuring that removal of the image file by the user will not result in loss of the image data.

45. A system for mounting a volume on a digital imaging device, the volume containing an image file, the system comprising:

means for detecting the insertion of the volume;

means for mounting the volume;

means for providing a database including a reference to the image file;

means for determining if the image file contains incompletely processed data; and means for completing image processing of the image file if the image file contains incompletely processed data.

46. The system of claim 45 wherein the volume further includes a plurality of items; and wherein the means for providing database further include:

means for determining if an item of the plurality of items is a file.

47. The system of claim 46 wherein the means for providing the database further include:

means for determining if the item on the volume is the image file if the item is a file.

48. The system of claim 47 wherein the means for providing the database further include:

means for determining if a duplicate file of the image file exists; and means for retaining only a newer file residing on the digital imaging device of the duplicate file and the image file.

49. The system of claim 48 wherein the image file further has a name having a three character extension and wherein the means for determining if the image file contains incompletely processed data further comprise:

means for determining the three character extension indicates the image file contains incompletely processed data.

50. The system of claim 49 wherein the means for determining if the image file contains incompletely processed data further include:

means for providing the incompletely processed data to a first stage of the plurality of stages.

51. The system of claim 50 wherein the digital imaging device is a digital camera.

52. The system of claim 51 wherein the volume further includes a removable memory.

53. The system of claim 52 wherein the database is a sortable linked list of a plurality of available images.

54. The system of claim 53 wherein the means for determining if the image file contains incompletely processed data further include:

means for determining a completed stage of a plurality of processing stages that the incompletely processed data having finished; and means for providing the incompletely processed data to a next stage of the plurality of stages, the next stage being immediately after the completed stage.

* * * * *